United States Patent [19]
Yagi

[11] Patent Number: 4,839,620
[45] Date of Patent: Jun. 13, 1989

[54] SOLENOID ACTUATED CONTROL CABLE

[75] Inventor: Mikiya Yagi, Nishinomiya, Japan

[73] Assignee: Nippon Cable System Inc., Takarazuka, Japan

[21] Appl. No.: 134,485

[22] Filed: Dec. 17, 1987

[30] Foreign Application Priority Data

Dec. 20, 1986 [JP] Japan ............................... 61-304864
Mar. 16, 1987 [JP] Japan ............................ 62-38020[U]

[51] Int. Cl.⁴ .............................................. H01F 7/00
[52] U.S. Cl. ..................................... 335/219; 335/268
[58] Field of Search ............... 335/255, 256, 261, 266, 335/268, 279, 219

[56] References Cited
U.S. PATENT DOCUMENTS 3,486,147 12/1969 Macy ............................. 335/267 X

FOREIGN PATENT DOCUMENTS

60-135457 9/1985 Japan .
61-129075 8/1986 Japan .
61-1290768 8/1986 Japan .

Primary Examiner—George Harris
Attorney, Agent, or Firm—Armstrong, Nikaido, Marmelstein, Kubovcik & Murray

[57] ABSTRACT

A solenoid-actuated control cable comprising a solenoid having one moving core and one set of a first coil and a second coil disposed along the direction of movement of the moving core, wherein to energize one coil makes the moving core attracted in one direction while to energize the other coil makes the moving attracted in the opposite direction and at least one inner cable connected to one end of the moving core and at least one inner cable or a rod connected to the other end of the moving core.

19 Claims, 10 Drawing Sheets

SOLENOID ACTUATED CONTROL CABLE

BACKGROUND OF THE INVENTION

The present invention relates to a solenoid-actuated control cable, and more particularly to a solenoid-actuated control cable which enables to operate two or more mechanisms independently by means of one actuator.

Hitherto, there are known devices each of which utilizes a control cable or control cables as a means for providing output, and examples of such device are openers for automotive disclosed in Japanese Unexamined Utility Model Publication No. 135457/1985 and Japanese Unexamined Utility Model Publication No. 129075/1985 (hereinafter referred to as Conventional Device I). Conventional Device I is equipped with an electric motor for winding to actuate two inner cables, wherein a rotational direction of the motor provides unlocking operation of a covering lid for fueling connection (hereinafter referred to as a fuel lid), while another direction of the motor provides unlocking operation of a trunk lid or a hatchback door.

Figure 19:
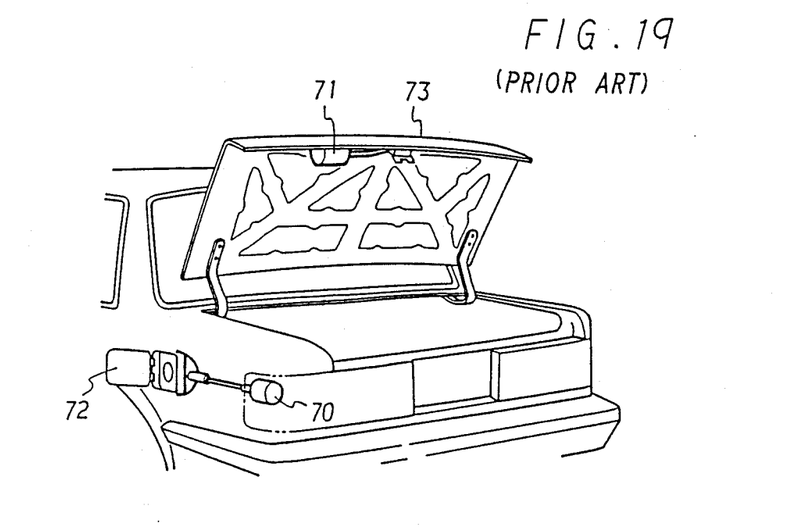
FIG. 19 is a perspective view of an unlocking device of the Conventional Device II to explain prior art.

Another example of the conventional unlocking device (hereafter reffered to as Conventional Device II) is shown in FIG. 19. Conventional Device II is equipped with two solenoid-actuators 70 and 71 of which the moving cores are connected with inner cables for operation, so that one solenoid-actuator 70 can be used for unlocking operation of a fuel lid 72 and the other solenoid-actuator 71 can be used for unlocking operation of a trunk lid 73 or a hatchback door.

However, Conventional Device I has a drawback that the electric motor is necessarily mounted with a speed reducer and a winding drum and requires large installation space, resulting in limited freedom in arrangement of the device.

Conventional Device II also requires large installation space and the device is heavy because of using two solenoids. For example, the device using two solenoids weighs about 600 kg excluding cables, because the weight of each solenoid is about 300 kg.

An object of the present invention is to provide a solenoid-actuated control cable which requires small installation space and is light in weight.

SUMMARY OF THE INVENTION

The first aspect of the present invention relates to a solenoid-actuated control cable comprising a solenoid mechanism (hereinafter referred to as a solenoid) having one moving core and one set of first coil and a second coil disposed along the direction of movement of the moving core, wherein to energize one coil makes the moving core attracted in one direction while to energize the other coil makes the moving core attracted in the opposite direction and at least two inner cables connected to the ends of the moving core in such a manner that each end of the moving core is connected with at least one inner cable.

The second aspect of the present invention relates to a solenoid-actuated control cable comprising a solenoid having one moving core and one set of a first coil and a second coil disposed along the direction of movement of the moving core, wherein to energize one coil makes the moving core attracted in one direction while to energize the other coil makes the moving core attracted in the opposite direction, at least one inner cable connected to one end of the moving core and a rod connected to the other end of the moving core.

In the first aspect of the present invention, the direction in which the moving core is attracted can be selected by energizing the first coil or the second coil. Namely, when the first coil is energized with the second coil being deenergized, the moving core is attracted in one direction so that pulling force for a desired operation is transmitted by at least one inner cable conncted to one end of the moving core. On the contrary, when the second coil is energized after the first coil is deenergized, the moving core is attracted in the opposite direction so that pulling force for another desired operation is transmitted by at least one inner cable connected to the other end of the moving core.

Also in the second aspect of the present invention, pulling force for each desired operation is transmitted by at least one inner cable connected to one end of the moving core or alternatively by a rod connected to the other end thereof.

Thus, only one moving core is required in the device of the present invention although at least two inner cables or at least one inner cable and a rod are actuated. The above construction of the present invention makes a device small and light to provide less restriction in the arrangement thereof and to contribute to reducing the weight of the device.

BRIEF DESCRIPTION OF THE DRAWINGS

The features and advantages of a solenoid-actuated control cable of the present invention will become more clearly appreciated from the following description in conjunction with the accompanying drawings, in which.

DETAILED DESCRIPTION

Hereinafter, there is explained the present invention based on embodiments.

Figure 1:
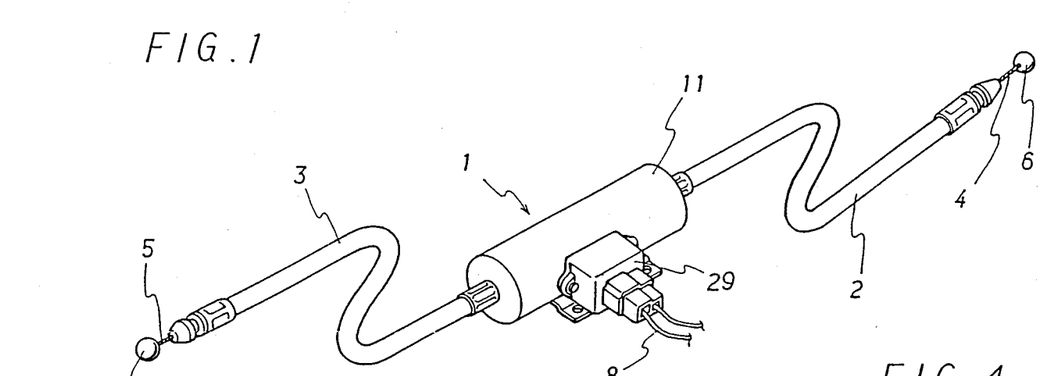
FIG. 1 is a perspective view of an embodiment of a solenoid-actuated control cable in accordance with the first aspect of the present invention.

There is shown an embodiment of the first aspect of the present invention in FIG. 1, wherein the numeral 1 is a solenoid, the numerals 2 and 3 are conduits of control cables and the numerals 4 and 5 are inner cables.

The solenoid 1 serves as an actuator of the device in accordance with the first aspect of the present invention and usually fixed to a suitable location in an automotive body, a building, a machinery or the like. The numeral 8 is each electric cable, which is so arranged as to make the device operable from switches or the like near driver's seat or on inner wall. A casing 11 of the solenoid 1 has a nearly cylindrical shape and is connected at the both end wall with conduits 2 and 3 of control cables. Each of the conduits 2 and 3 is laid on a proper route to each mechanism to be operated. Inner cables 4 and 5 for transmitting operating force are guided slidably in the conduits 2 and 3, and the ends of the inner cables 4 and 5 are respectively fitted with end fittings 6 and 7.

Figure 2:
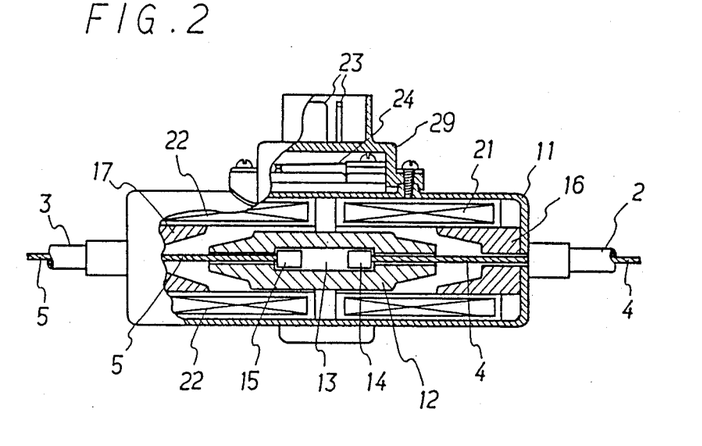
FIG. 2 is a partially sectional side view of the solenoid of the embodiment shown in FIG. 1.
Figure 3:
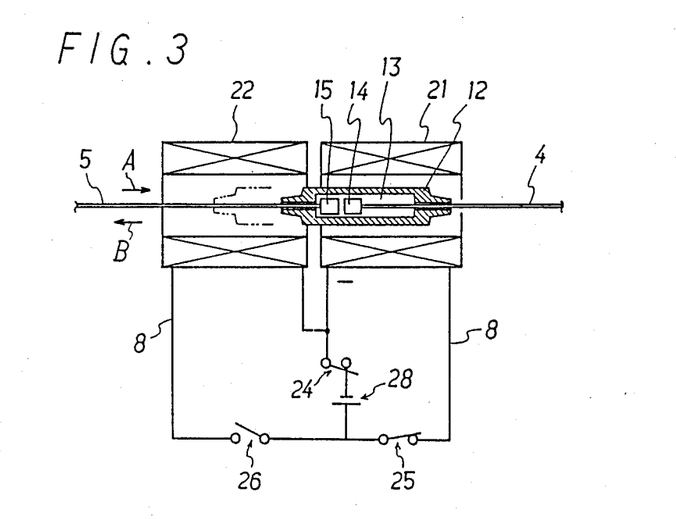
FIG. 3 is a diagram of electrical circuit of the solenoid shown in FIG. 2.

Next, there is explained the solenoid 1 referring to FIG. 2 and FIG. 3. A moving core 12 is disposed at the center of the casing 11, and the moving core 12 has a hollow space 13 internally. A nipple 14 fixed to the end of the inner cable 4 and a nipple 15 fixed to the end of the inner cable 5 are disposed in the hollow space 13. Fixed cores 16 and 17 are fixed respectively to inside surfaces of the both end walls of the casing 11. There is provided a distance according to the required stroke of the moving core 12 between the fixed cores 16 and 17.

The moving core 12 and the fixed cores 16 and 17 are surrounded by a first coil 21 and a second coil 22 which are mounted on the inside surface of the casing 11.

The first coil 21 and the second coil 22 are mounted in tandem arragement along the direction of movement of the moving core 12. In FIG. 2 and FIG. 3, the first coil 21 is illustrated on the right side and the second coil 22 is on the left side.

At the upper portion of the casing 11 in FIG. 2, a box 29 is shown. The lower portion of the box 29 is equipped with a bimetal 24 and the upper portion thereof is equipped with connection terminals 23. The connection terminals 23 are connected with the electric cables 8, and the bimetal 24 prevents the solenoid 1 from overheating.

As shown in FIG. 3, a circuit for the first coil 21 includes a power source 28, a first switch 25 and the electric cables 8 for connecting them, while a circuit for the second coil 22 includes the common power source 28, a second switch 26 and the electric cables 8. The bimetal 24 is provided between the common power source 28 and the first and second coils 21 and 22 in order to protect the solenoid 1. The first and second switches 25 and 26 can be located remotely from the solenoid 1 by extending the electric cables 8 for easier operation.

There is explained next the function of the aforementioned solenoid.

Referring to FIG. 3, when the first switch 25 is put into contact, only the first coil 21 is energized and the moving core 12 is attracted to the right side, so that the inner cable 5 is pulled in the direction of the arrow A. During this operation, the movement of the moving core 12 is not transmitted to the inner cable 4 by virtue of the hollow space 13. Thereafter, the first switch 25 is put out of contact to deenergize the first coil 21.

On the contrary, when the second switch 26 is put into contact, only the second coil 22 is energized and the moving core 12 is attracted to the left side in FIG. 3, so that the inner cable 4 is pulled in the direction of arrow B.

When the solenoid is operated for a long duration of time or when the first and the second switches 25 and 26 are put into contact simultaneously by an operational error resulting in excess current at the bimetal 24, the bimetal 24 is heated up to open the contact thereof, then electric supply to the both coils 21 and 22 is cut out so that the solenoid 1 is protected from overheating and the like.

Next, there is explained another embodiment of the first aspect of the present invention.

Figure 4:
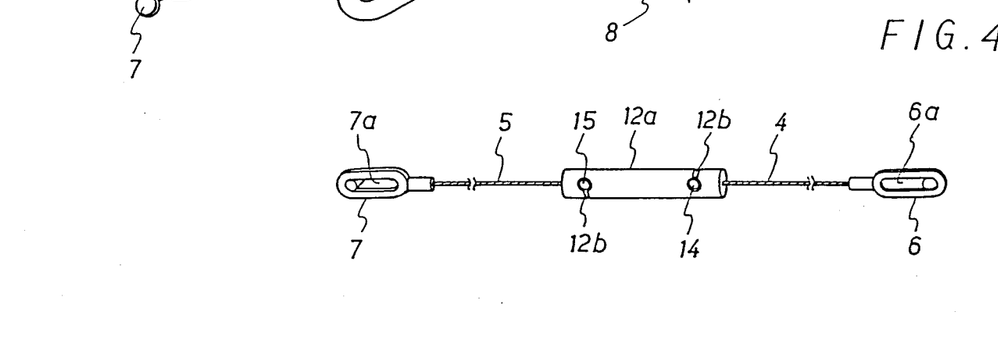
FIG. 4 is a perspective view of a moving core of a solenoid in another embodiment of the present invention.

A moving core used in the first aspect of the invention can have a construction shown in FIG. 4. This moving core 12a has a cylindrical shape and has engaging cuttings 12b on both sides. The engaging cuttings 12b are provided to receive and catch nipples 14 and 15. The construction of this type does not have a hollow space inside thereof, but end fittings 6 and 7 having elongated holes 6a and 7a are fixed to the ends of inner cables 4 and 5 to serve with the same function as the hollow space. By using the moving core of this type, pulling operation in either of two direction is readily achieved similarly to the previous embodiment, and the movement of the idle side inner cable 4 or 5 is absorbed by the elongated hole 6a or 7a.

As further embodiment of the device in accordance with the first aspect of the present invention, there can be employed a construction wherein three or more inner cables are connected to a moving core. In this construction, the moving core can be connected with one inner cable at one end and a plurality of inner cables at the other end, or can be connected with plurality of inner cables at each end.

Next, there is explained example applications of the aforementioned embodiments.

Example applications of the first aspect of the present invention to an opener for automotive use are shown in FIG. 5 through FIG. 8. In an example shown in FIG. 5 and FIG. 6, a solenoid-actuated control cable is used for unlocking of a fuel lid 30 and a trunk lid 31, and a solenoid 1 is located in a trunk room 32. An inner cable 4 is guided by a conduit 2 of a control cable and connected to a locking click 33a in a locking mechanism 33 for a fuel lid 30, while another inner cable 5 is guided by another conduit 3 and connected to a locking lever 34a in a locking mechanism 34 for a trunk lid 31.

Figure 5:
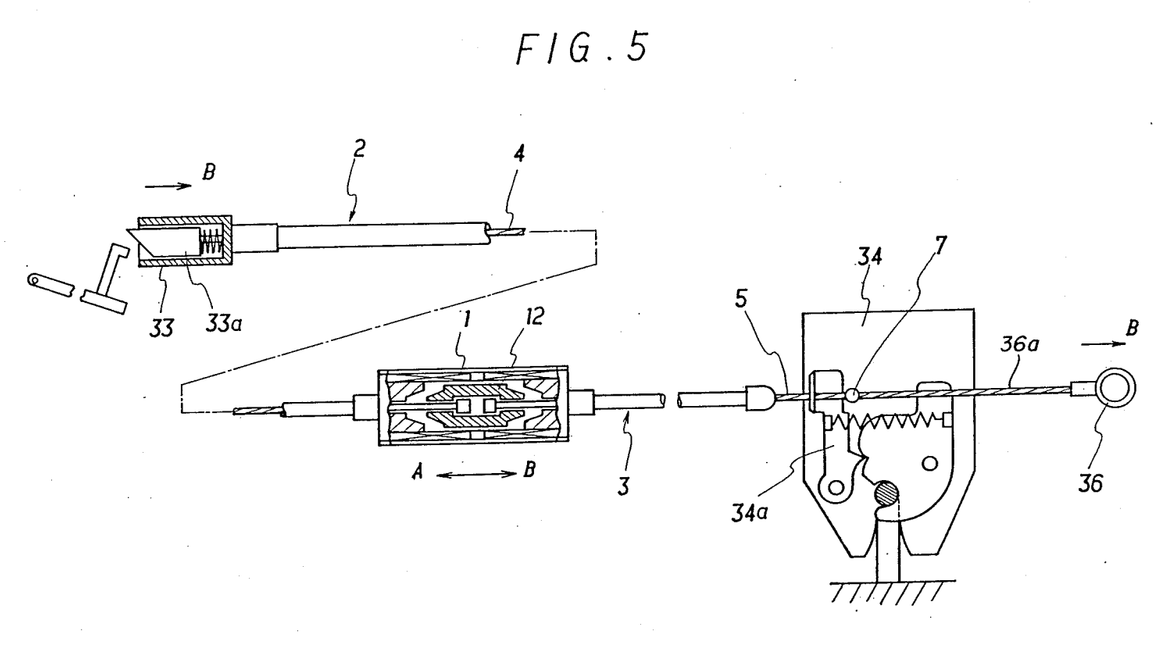
FIG. 5 is a partially sectional side view showing an example application of a solenoid-actuated control cable of the first aspect of the present invention.
Figure 6:
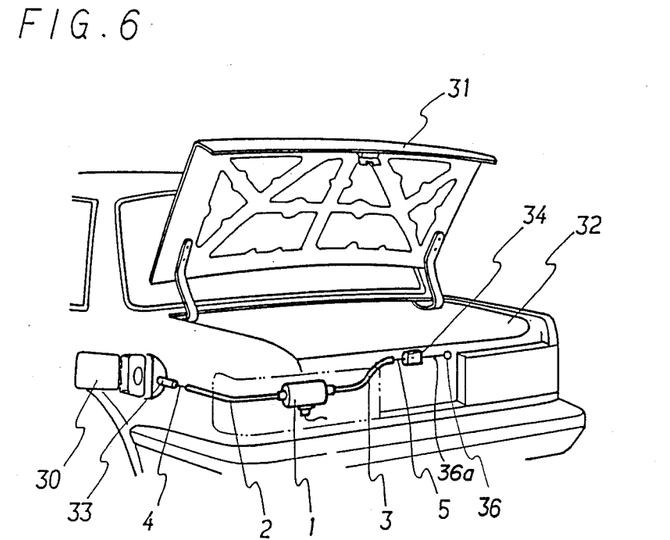
FIG. 6 through FIG. 8 are perspective views showing example applications of the first aspect of the present invetion to openers for automotive use.

In unlocking operation by means of operating the locking click 33a or the locking lever 34a, a selected coil in the solenoid is returned into deenergized condition immediately after a desired unlocking operation is completed. Therefore, the locking click 33a or the locking lever 34a is returned into the normal position thereof by a spring or the like usually provided in a locking mechanism, so that the next locking operation is achieved automatically when the fuel lid 30 or the trunk lid 31 is closed manually.

In addition, in the example shown in FIG. 5 and FIG. 6, the inner cable 5 is extended through an end fitting 7, and the end of the extended part 36a is fitted with a pulling eye 36 to form a manually operated means. The extended part 36a and the pulling eye 36 serve as a manual unlocking means.

When the unlocking operating cannot be achieved by the aforementioned electric unlocking device due to some trouble in the solenoid and the like, a fuel lid and a truck lid have to be unlocked manually. In case of a trunk lid, it is usually possible to unlock manually using a key. However, a fuel lid usually does not have such a provision, because to make a keyhole on a fuel lid is undesirable from a view point of appearance. Accordingly the above manual unlocking means is useful for a fuel lid and a suchlike part, because the means enables to unlock remotely. As shown in FIG. 5, even when some trouble occurs in the solenoid, the pulling eye 36 provided on the side of the locking mechanism 34 for trunk lid is pulled in the direction of arrow B to move the inner cable 5 and the moving core 12 in the direction of arrow B, and therefore, the inner cable 4 also moves in the direction of arrow B to unlock the locking mechanism 33 for the fuel lid.

The manually operated means such as the pulling eye 36 can be connected directly to the end fitting 7.

Although there was explained above an example of an opener for a trunk lid and a fuel lid, the solenoid-actuated control cable with or without the above-mentioned manual unlocking means can be applied also to an opener for a hatchback door and a fuel lid.

Moreover, the solenoid-actuated control cable of the present invention can be applied to various industrial machineries as described later, and in like manner, a manual unlocking means having a construction similar to the example explained before can be employed as a manually operated means in those applications.

Since the solenoid explained in the first aspect of the present invention is small and occupies little installation space in the trunk 32, space conservation in the trunk 32 is effectively achieved.

Figure 7:
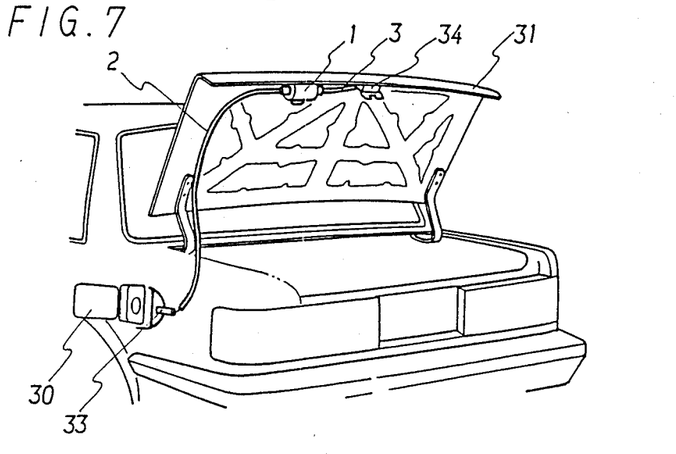

Another example is shown in FIG. 7, in which a solenoid 1 is mounted on an inner surface of a trunk lid 31. Since the solenoid is small and light, it can be mounted satisfactorily on a movable part like the trunk lid 31.

Figure 8:
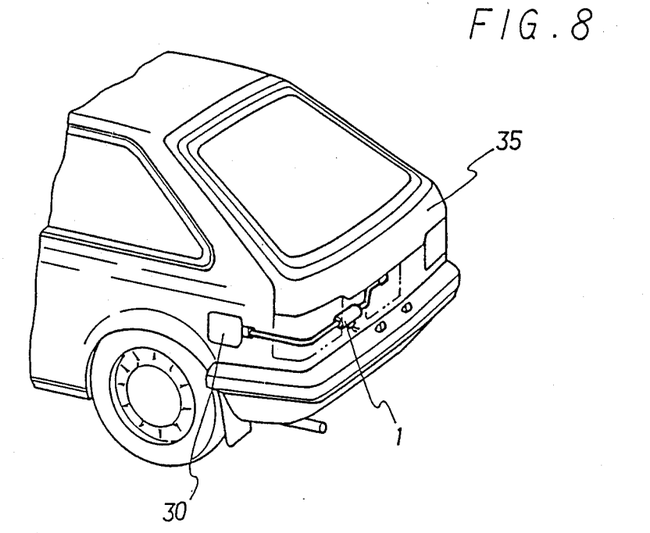

Further example is shown in FIG. 8 in which the device is connected to locking mechanisms for a fuel lid 30 and a hatchback door 35. Although a solenoid is mounted on the body in FIG. 8, it can be mounted alternatively on the hatchback door 35.

Moreover, the solenoid-actuated control cable of the present invention can be applied also to an opener for locking mechanisms for a hood and a trunk lid.

Figure 9:
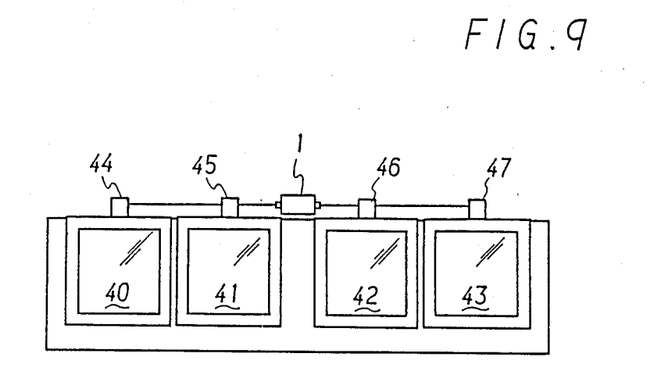
FIG. 9 is an explanatory drawing of an example application of the first aspect of the present invention to a window opener.
Figure 10:
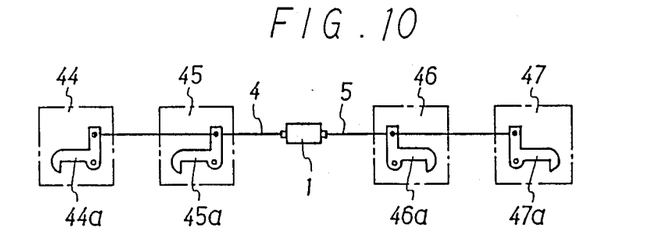
FIG. 10 is an explanatory drawing of a mechanism of a window opener to which the first aspect of the present invention is applied.

There is shown an example in FIG. 9 and FIG. 10, in which the solenoid-actuated control cable of the first aspect of the present invention is applied to opening mechanisms for skylight covers and smoke-exhaust covers. In FIG. 9, the numerals 40, 41, 42 and 43 are skylight covers, smoke-exhaust covers or suchlike equipped with opening mechanisms 44, 45, 46 and 47. As shown in FIG. 10, locking clicks 44a and 45a of the opening mechanisms 44 and 45 are connected with an inner cable 4, while locking clicks 46a and 47a of the opening mechanisms 46 and 47 are connected with inner cables 5. In each opening mechanism, when the connecting portion of the locking click is pulled by the inner cable, the skylight cover or the smoke-exhaust cover is released from the locking click and automatically opened by a kick-out spring (not shown in the drawings) or suchlike.

Thus in this example, when the inner cable 4 is pulled by a solenoid 1, the covers 40 and 41 are opened, while when the inner cable 5 is pulled, the covers 42 and 43 are opened.

Although FIG. 9 and FIG. 10 show an example wherein two covers are operated by one inner cable, three or more covers can be operated in a similar manner.

There is an advantage that a desired series of covers can be opened by just operating a switch, when the solenoid-actuated control cable of the first aspect of the present invention is applied to such an opening mechanism as mentioned above.

There are explained below further example applications of the first aspect of the present invention. However, an extent of application is not limited to these example applications but the solenoid-actuated control cable in accordance with the present invention can be applied to any mechanisms which can be operated by pulling force.

In FIG. 11 through FIG. 17 explained below, the numeral 1 is always a solenoid to be used in the first aspect of the present invention and the numerals 4 and 5 are always inner cables.

Figure 11:
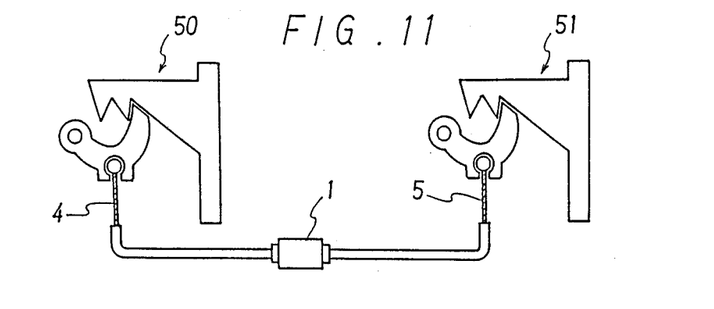
FIG. 11 through FIG. 17 are explanatory drawings showing further example applications of the first aspect of the present invention.

FIG. 11 shows an example application in which the solenoid-actuated control cable is applied to two interlocking mechanisms 50 and 51. Such an interlocking system is used, for example, in an automatic vending machine, a game machine, a crossing gate, a conveyer and the like.

Figure 12:
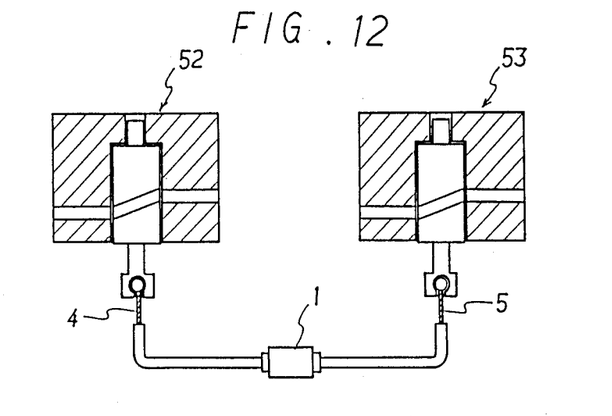

FIG. 12 shows another example application in which the solenoid-actuated control cable is applied to two valves 52 and 53. Such a valve is used, for example, in a hydraulic system, a pneumatic system, and the like.

Figure 13:
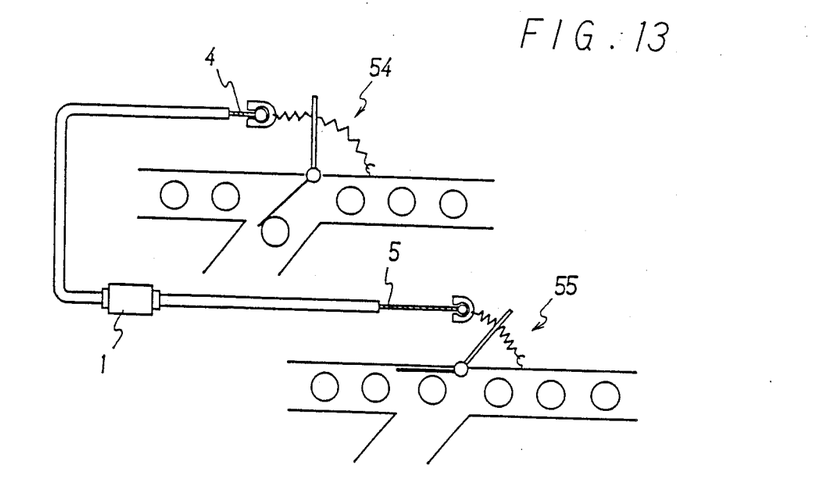

FIG. 13 shows a further example application in which the solenoid-actuated control cable is applied to two selecting divertor mechanisms 54 and 55.

Figure 14:
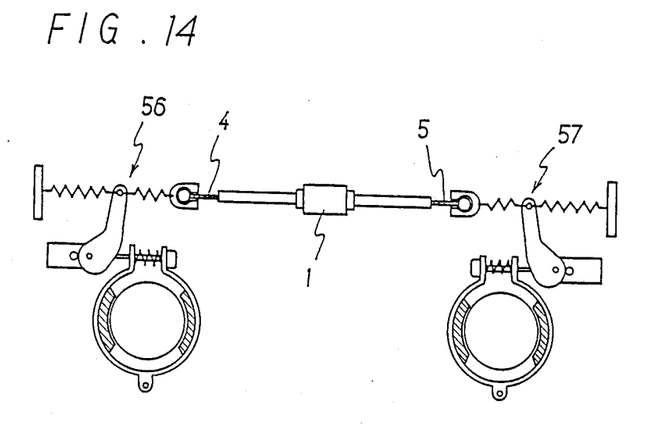

FIG. 14 shows a still further example application in which the solenoid-actuated control cable is applied to two brake mechanisms 56 and 57. Such a brake system is used, for example, in a machine tool, a wood working machine, a hoist and the like.

Figure 15:
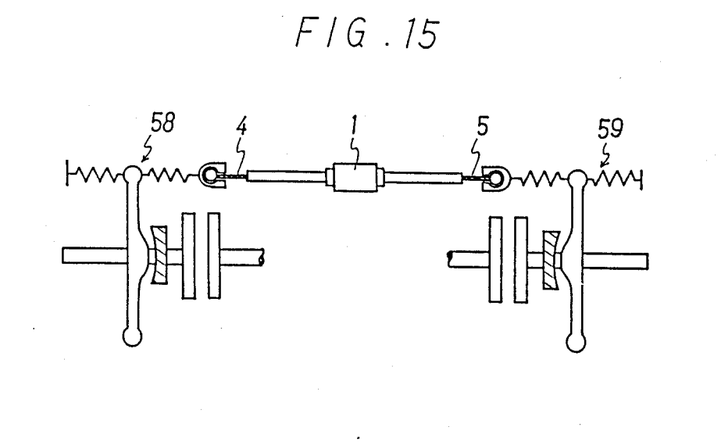

FIG. 15 shows another example application in which the solenoid-actuated control cable is applied to two clutch mechanisms 58 and 59. Such a clutch system is used, for example, in a vending machine, a machine tool, a textile machine, safety equipment, emergency equipment, a shutter and the like.

Figure 16:
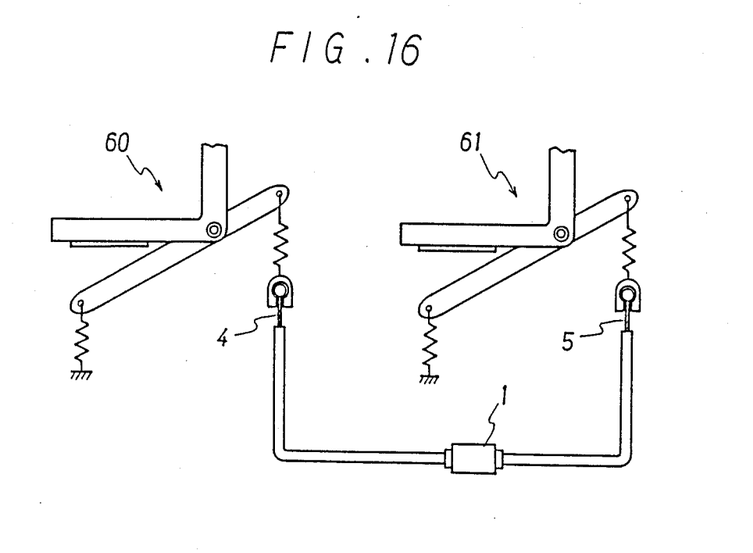

FIG. 16 shows a further example application in which the solenoid-actuated control cable is applied to two lever mechanisms 60 and 61. Such a lever system is used, for example, in a business machine, a vending machine, a register and the like.

Figure 17:
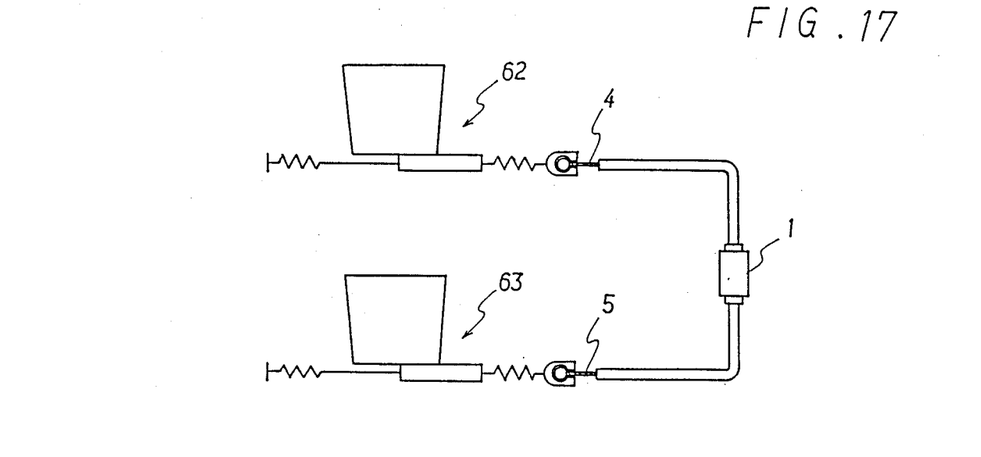

FIG. 17 shows a still further example application in which the solenoid-actuated control cable is applied to two hopper mechanisms 62 and 63. Such a hopper system is used, for example, in an automatic weighing machine, a packaging machine and the like.

Although the other example applications are not illustrated in the drawings, the solenoid-actuated control cable can be applied also to ventilating equipment, a drying furnace, a shutter for a freezing chamber, a control mechanism for a domestic gas fired boiler, miscellaneous pin mechanisms, a gear mechanism, a locking mechanism, a switch for electric terminal and other various use.

Figure 18:
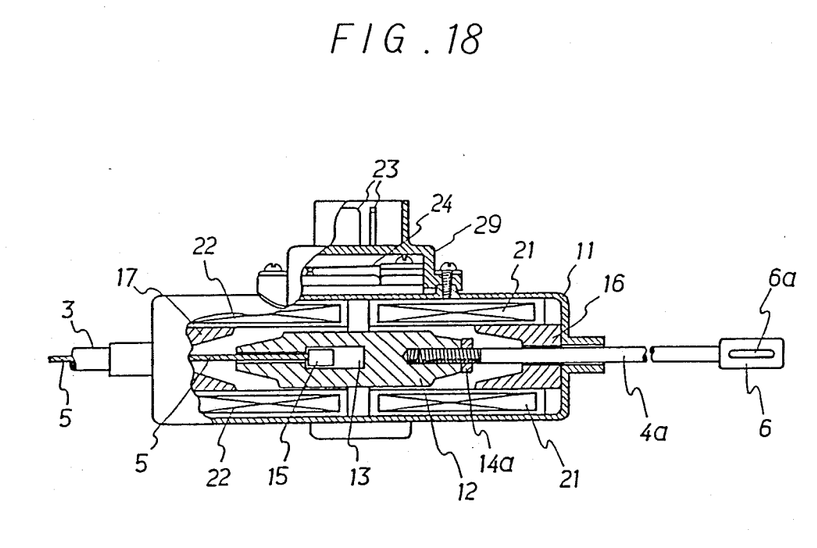
FIG. 18 is a partially sectional side view of an embodiment of a solenoid-actuated control cable in accordance with the second aspect of the present invention.

Next, there is explained the second aspect of the present invention referring to FIG. 18.

An embodiment shown in FIG. 18 has a construction similar to that shown in FIG. 2 but one inner cable in FIG. 2 is replaced by a rod 4a in FIG. 18. The rod 4a can be connected to a moving core by any suitable means. However, in this embodiment, a threaded part provided near the end of the rod is engaged with a female-threaded part provided near the end of the moving core 12, and additionally a lock nut 14a is used for tightening.

In FIG. 18, the rod 4a can be arranged also on the left side of the moving core 12 with the inner cable being connected to the right side of the moving core 12.

A hollow space 13 provided in the moving core 12 is used for housing only a nipple of inner cable 5, and accordingly is required to have a length almost equal to only half of that shown in FIG. 2. Another end of the rod 4a is fitted with an end fitting 6 having an elongated hole 6a. Alternatively, the opponent member can be provided with a necessary play for absorbing the idling movement of the rod 4a in order to allow the end fitting 6 to have an ordinary hole.

Other part of the construction of the solenoid in FIG. 18 than desribed above has substantially no difference from that shown in FIG. 2.

In addition, the manually operated means, for example the extended part 36a and the pulling eye 36 in FIG. 5, can be provided in the embodiment shown in FIG. 18.

Moreover, a plurality of inner cables can be connected instead of the single inner cable 5 as an alternative embodiment.

The solenoid-actuated control cable in accordance with the second aspect of the invention can be applied as well as that in accordance with the first aspect thereof, to openers for automotive use, opening mechanisms for covers and unlocking mechanisms in various kinds of mechanical equipment.

In the application to openers for automotive use, the end of the rod 4a is connected to a mechanism on one side such as a locking mechanism for a fuel lid or one of a trunk lid and a hatchback door, while the inner cable 5 is connected to a mechanism on the other side such as a locking mechanism for one of the trunk lid and a hatchback door or a fuel lid. In a similar manner, locking mechanisms for a hood and a trunk lid can be connected with a solenoid-actuated control cable in accordance with the second aspect of the present invention.

In the application to opening mechanisms for covers, the rod 4a is connected to a mechanism on one side, while the inner cable 5 is connected to a mechanism on the other side.

The applications to various mechanisms shown in FIG. 11 to FIG. 17 are also possible by connecting the rod 4a to a mechanism on one side and by connecting the inner cable 5 to a mechanism on the other side.

The solenoid-actuated control cable in accordance with the second aspect of the present invention as well as that in accordance with the first aspect thereof has an advantage that it can be installed in a small space.

In spite of the explanation hereinbefore of the embodiments in accordance with the first and the second aspects of the present invention, the present invention can be used in various applications without being limited to the embodiments and can be modified as far as the gist thereof is not changed.

The first and the second aspects of the present invention provide solenoid-actuated control cables wherein at least two inner cables or a rod and at least one inner cable can be pulled for actuation using one solenoid, and thereby the structure of the device can be made light and small.

The foregoing and other objects, features and advantages of this invention will be from the following, more particular, description of the preferred embodiments of this invention, as illustrated in the accompanying drawings.

What we claim is:

1. A solenoid-actuated control cable comprising:
   (a) a solenoid having one moving core capable of moving along a direction and one set of a first coil and a second coil disposed along the direction of movement of the moving core, wherein to energize one coil makes the moving core attracted in one direction while to energize another coil makes the moving core attracted in another direction; and
   (b) at least two inner cables connected to ends of the moving core in such a manner that each end of the moving core is connected with at least one inner cable.

2. The control cable of claim 1, wherein the moving core has a hollow space internally in which nipples fixed to ends of the inner cables are housed slidably, the hollow space is long enough to allow the required stroke of the moving core, and inner end surface of the hollow space are engageable with the nipples.

3. The control cable of claim 1, wherein the moving core has engaging cuttings on both side in which nipples fixed to ends of the inner cable are caught, and the opposite ends of the inner cables are fitted with end fitting having elongated holes.

4. The control cable of claim 1, wherein a bimetal is provided in a box mounted on a casing of the solenoid in order to prevent overheating.

5. The control cable of claim 1, wherein an end of one inner cable and an end of another inner cable are connected respectively to locking mechanisms for a fuel lid and a trunk lid of a vehicle.

6. The control cable of claim 1, wherein an end of one inner cable and an end of another inner cable are connected respectively to locking mechanisms for a fuel lid and a hatchback door of a vehicle.

7. The control cable of claim 1, wherein an end of one inner cable and an end of another inner cable are connected respectively to opening mechanisms for two groups of smoke-exhaust covers.

8. The control cable of claim 1, wherein at least one inner cable on at least one side is provided with a manually operated means which enables manual pulling operation for the at least one inner cable on the other side.

9. A solenoid-actuated control cable comprising:
   (a) a solenoid having one moving core capable of moving along a direction and one set of a first coil and a second coil disposed along the direction of movement of the moving core, wherein to energize one coil makes the moving core attracted in one direction while to energize another coil makes the moving core attracted in another direction; and
   (b) at least one inner cable connected to one end of the moving core and a rod connected to another end of the moving core.

10. The control cable of claim 9, wherein the moving core has a hollow space internally in which a nipple fixed to an end of the inner cable is housed slidably, the hollow space is long enough to allow a required stroke of the moving core, and an inner end surface of the hollow space is engageable with the nipple.

11. The control cable of claim 9, wherein the moving core has an engaging cutting on one side in which a nipple fixed to an end of the inner cable is caught, the opposite end of the inner cable being fitted with an end fitting having an enlonged hole, and the moving core is connected with a rod on the other side, the opposite end of the rod being provided with an end fitting having an elongated hole.

12. The control cable of claim 9, wherein a bimetal is provided in a box mounted on a casing of the solenoid in order to prevent overheating.

13. The control cable of claim 9, wherein one inner cable is connected to a locking mechanism for a fuel lid and the rod is connected to a locking mechanism for a trunk lid of a vehicle.

14. The control cable of claim 9, wherein the rod is connected to locking mechanism for a fuel lid and one inner cable is connected to a locking mechanism for a trunk lid of a vehicle.

15. The control cable of claim 9, wherein one inner cable is connected to a locking mechanism for a fuel lid and the rod is connected to a locking mechanism for a hatchback door of a vehicle.

16. The control cable of claim 9, wherein the rod is connected to a locking mechanism for a fuel lid and one inner cable is connected to a locking mechanism for a hatchback door of a vehicle.

17. The control cable of claim 9, wherein an end of one inner cable is connected to an opening mechanism for one group of smoke-exhaust covers and the rod is connected to another opening mechanism for another group of smoke-exhaust covers.

18. The control cable of claim 9, wherein the at least one inner cable on one side is provided with a manually operated means which enables manual pulling operation for the rod on the other side.

19. The control cable of claim 9, wherein the rod on one side is provided with a manually operated means which enables manual pulling operation for the at least one inner cable on the other side.

* * * * *